(12) United States Patent
Klugman (10) Patent No.: US 7,711,634 B2
(45) Date of Patent: May 4, 2010

(54) FLEXIBLE CATASTROPHE BOND

(75) Inventor: Judith Klugman, New York, NY (US)

(73) Assignee: Swiss Reinsurance Company, Zurich (CH)

( * ) Notice: Subject to any disclaimer, the term of this patent is extended or adjusted under 35 U.S.C. 154(b) by 1546 days.

(21) Appl. No.: 10/806,572

(22) Filed: Mar. 22, 2004

(65) Prior Publication Data

US 2005/0216386 A1 Sep. 29, 2005

Related U.S. Application Data

(60) Provisional application No. 60/457,423, filed on Mar. 24, 2003.

(51) Int. Cl.
*G06Q 30/00* (2006.01)
(52) U.S. Cl. .............................. 705/38; 705/39; 705/40; 705/42; 705/44
(58) Field of Classification Search ............. 705/36–44; 704/231; 708/100
See application file for complete search history.

(56) References Cited

U.S. PATENT DOCUMENTS

| | | | |
|---|---|---|---|
| 6,321,212 B1 * | 11/2001 | Lange | 705/36 R |
| 6,963,853 B1 * | 11/2005 | Smith | 705/36 R |
| 7,225,153 B2 * | 5/2007 | Lange | 705/37 |
| 2002/0069155 A1 * | 6/2002 | Nafeh et al. | 705/37 |
| 2002/0099640 A1 * | 7/2002 | Lange | 705/37 |
| 2002/0147670 A1 * | 10/2002 | Lange | 705/35 |
| 2003/0115128 A1 * | 6/2003 | Lange et al. | 705/37 |
| 2003/0225656 A1 * | 12/2003 | Aberman et al. | 705/36 |
| 2003/0236738 A1 * | 12/2003 | Lange et al. | 705/37 |
| 2005/0102213 A1 * | 5/2005 | Savasoglu et al. | 705/36 |

OTHER PUBLICATIONS

"Sorema issues flexible cat bond", London, Jun. 1999, vol. 19, issue 6, p. 11 (1 page).*
"Birth of the cat bond", Canadian Underwriter, Don Mills, May 2001, vol. 68, issue 5, p. 18 (3 pages).*
"Financial Innovation In The Management Of Catastrophe Risk", Neil A. Doherty, Dec. 1997.*
"Optimal catastrophe insurance with multiple catastrophes", Henri Louberge, Harris Schesinger, Sep. 1999.*
"Catastrophe Risk Management—Implications of Default Risk and Basis Risk", Andreas Richter, Sep. 4, 2002.*
"Catastrophe Insurance Risks, The Role of Risk-Linked Securities and Factors Affecting Their Use", GAO-02-941, Sep. 2002.*
"Catastrophe Insurance Risks, The Role of Risk-Linked Securities and Factors Affecting Their Use", GAO-02941, dated Sep. 2002.*

(Continued)

*Primary Examiner*—James P Trammell
*Assistant Examiner*—Hai Tran
(74) *Attorney, Agent, or Firm*—Oblon, Spivak, McClelland, Maier & Neustadt, L.L.P.

(57) ABSTRACT

Methods and apparatus, including computer program products, for securitizing natural catastrophe risk. One or more risk classes representing natural catastrophe risks is are established, and a first collection of risk instruments of a first risk class of the one or more risk classes is issued. Each risk class is recurringly issuable as risk instruments providing a return on an investment. The amount of the return for a risk instrument is contingent upon the occurrence of a realization event for the corresponding represented natural catastrophe risk. Collections of risk instruments issued from recurringly issuable risk classes are also described.

17 Claims, 4 Drawing Sheets

OTHER PUBLICATIONS

J. Cavanagh, et al.; Alternative Transfer of Catastrophe Risk and the Lloyd's Market; pp. 6-9.

C. McGee; MMC Viewpoint, Catastrophe—Bonds Come of Age; http://www.mmc.com/views/00wintermcghee.shtml; pp. 1-4; dated 2000.

Michael S. Canter, et al.; CNA Re White Papers—Securization—History of the Cat Bond Market—The Foundation and Evolution of the Catastrophe Bond Market; http://www.cnare.com/rescenter/s2k_reports/catbonds.htm; pp. 1-5; dated 2002.

Aschkenasy, J.; Investopedia—Fair Weather Friends, Catastrophe Bonds are More Dependent on the Greenhouse Effect than Greenspan; http://www.investopedia.com/offsite.asp?URL=http:...tpub.com/archive/ps/98-03psmarch/march98PS58.html; pp. 1-4; dated 1998.

Belonsky, G. et al; Insurance-Linked Securities (Excerpted from Swiss Re New Markets); pp. 174-176; dated 1999.

Deal Round-Up—Capital Markets Innovation; www.reactionsnet.com; pp. 22-25; dated Jun. 2002.

SCOR—News—Press Release, SCOR Places EUR 130 Million Cover for Credit Reinsurance Risks; http://www.scor.com/us/4_communique.asp?num=904; p. 1 of 2; dated Apr. 17, 2002.

Wildermuth, D.; Operational Risk Conference—Using Capital Market Securities as Operational Risk Mitigants; pp. 1-13; dated Nov. 16, 2001.

The Manage Mentor—Knowledge Universe—Finance—Securitisation of Insurance Risks; http://www.themanagementor.com/kuniverse.kmailers_universe/finance_kmailers/FIFS; pp. 1-2; dated Aug. 27, 2002.

* cited by examiner

FLEXIBLE CATASTROPHE BOND

CROSS-REFERENCE TO RELATED APPLICATIONS

This application claims priority to pending U.S. Provisional Application Ser. No. 60/457,423, filed on Mar. 24, 2003.

BACKGROUND

The present invention relates to securitizing natural catastrophe risk.

A catastrophe bond is a financial instrument that represents an exchange of principal for periodic coupon payments, where the coupon payment and/or the return of the principal is linked to the occurrence of a specified natural catastrophe event. In a catastrophe bond transaction, the coupon payment is given to the investor up front, during the risk period associated with the catastrophe bond. In exchange, the investor posts the notional amount of the bond in an account or trust, such that the bond is fully collateralized and any credit risk is eliminated. If there is an event that exceeds the attachment point of the bond in the geographic region and during time period associated with the bond, some or all of the investors' principal is used to pay a sponsor under a reinsurance contract. If there are no trigger events in the relevant region during the relevant period, all of the principal is returned to the investors.

SUMMARY OF THE INVENTION

The present invention provides methods and apparatus, including computer program products, for securitizing natural catastrophe risk by issuing risk instruments of one or more risk classes that are issuable on a recurring basis. In general, in one aspect, the invention thus provides methods and apparatus, including computer program products, implementing techniques for securitizing natural catastrophe risk. The techniques include establishing one or more risk classes and issuing a first collection of risk instruments of a first risk class of the one or more risk classes. Each risk class represents one or more natural catastrophe risks, and is recurringly issuable as risk instruments providing a return on an investment. The amount of the return for a risk instrument is contingent upon the occurrence of a realization event for the corresponding represented natural catastrophe risk.

Particular implementations can include one or more of the following features. The risk classes can include a plurality of risk that represent individual natural catastrophe risks, and one or more risk classes that represent a combination of natural catastrophe risks represented by two or more of the plurality of risk classes. The individual natural catastrophe risks can be uncorrelated. Issuing the first collection of risk instruments can include issuing the first collection of risk instruments on a first issue date, and the techniques can include issuing a second collection of risk instruments of the first risk class on a second, later, issue date.

The risk instruments of the first risk class can have an associated plurality of terms, that include class terms and series terms. The class terms can be defined for all risk instruments of the first risk class during the establishing of the first risk class. The series terms can be defined for risk instruments of a given collection of risk instruments of the first series at the time of issuance of the collection. The series terms can include an interest spread defining an amount payable to an investor, and a maturity date defining a date on which a principal amount will be returned to the investor if no realization event has occurred.

The risk classes can represent natural catastrophe risks selected from the group consisting of hurricanes, windstorms, floods, and earthquakes. The risk classes can categorize natural catastrophe risks by region or by time period. The realization event for a given risk class can be defined as an occurrence of an event meeting a predetermined impact threshold. The occurrence of an event meeting a predetermined impact threshold can be determined according to an index of physical parameters.

In general, in another aspect, the invention provides methods and apparatus, including computer program products, implementing techniques for distributing instruments representing securitized natural catastrophe risk. The techniques includes receiving a first allotment of first risk instruments of a risk class representing one or more natural catastrophe risks and distributing first risk instruments of the first allotment to one or more investors. The risk class is issuable on a recurring basis. Each of the first risk instruments has a first issue date and provides a return on an investment. The amount of the return is contingent upon the occurrence of a realization event for the corresponding represented natural catastrophe risk.

Particular implementations can include one or more of the following features. An allotment of second risk instruments of the risk class can be received. Each of the second risk instruments can have a second issue date that is later than the first issue date. The second risk instruments of the second allotment can be distributed to one or more investors. Risk instruments of the risk class can have an associated plurality of terms. The terms can class terms and series terms. The class terms can be defined for all risk instruments of the risk class. The series terms can be defined for risk instruments of a given collection of risk instruments of the first series at the time of issuance of the collection. The series terms can include an interest spread defining an amount payable to an investor, and a maturity date defining a date on which a principal amount will be returned to the investor if no realization event has occurred.

In general, in a third aspect, the invention provides collections of risk instruments representing a securitized natural catastrophe risk. The collections include one or more risk instruments tangibly embodied in an information carrier. The one or more risk instruments are associated with a first risk class representing one or more natural catastrophe risks. The first risk class is issuable on a recurring basis. Each risk instrument provides a return on an investment. The amount of the return is contingent upon the occurrence of a realization event for the corresponding represented natural catastrophe risk.

In general, in still another aspect, the invention provides collections of risk instruments representing a securitized natural catastrophe risk. These collections include one or more first risk instruments tangibly embodied in an information carrier and one or more second risk instruments tangibly embodied in an information carrier. The first risk instruments are associated with a first risk class. The first risk class represents one or more natural catastrophe risks. The first risk instruments have a first issue date, a first interest spread defining an amount payable to an investor, and a first maturity date defining a date on which a principal amount will be returned to the investor if no realization event has occurred. The second risk instruments are also associated with the first risk class. The second risk instruments have a second issue date, a second interest spread defining an amount payable to an investor, and a second maturity date defining a date on which a principal amount will be returned to the investor if no realization event has occurred. The first and second interest spreads and the first and second maturity dates are determined according to the issue date of the first and second risk instruments, respectively.

The invention can be implemented to realize one or more of the following advantages. Securitizing natural catastrophe risk gives sponsors an alternative to the conventional reinsurance market. Catastrophe bonds are fully collateralized, so that payment in the event of a triggering event is guaranteed. Issuing natural catastrophe bonds at recurring intervals can give sponsors regular access to the capital markets, providing stable, multi-year coverage for natural catastrophe risk. The coverage available to the sponsor is readily scalable, depending on market conditions. Issuance of such bonds at recurring intervals can also provide a regular supply of catastrophe bonds to those markets, making the catastrophe bond market more reliable, and therefore more attractive, to investors. Establishing classes of catastrophe bonds that can be issued on a recurring basis can reduce transaction costs associated with each catastrophe bond issuance. Using standardized parametric indices based on well-defined physical triggers frees the sponsor from disclosing information about its risk portfolio that would be required for loss-based triggers. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
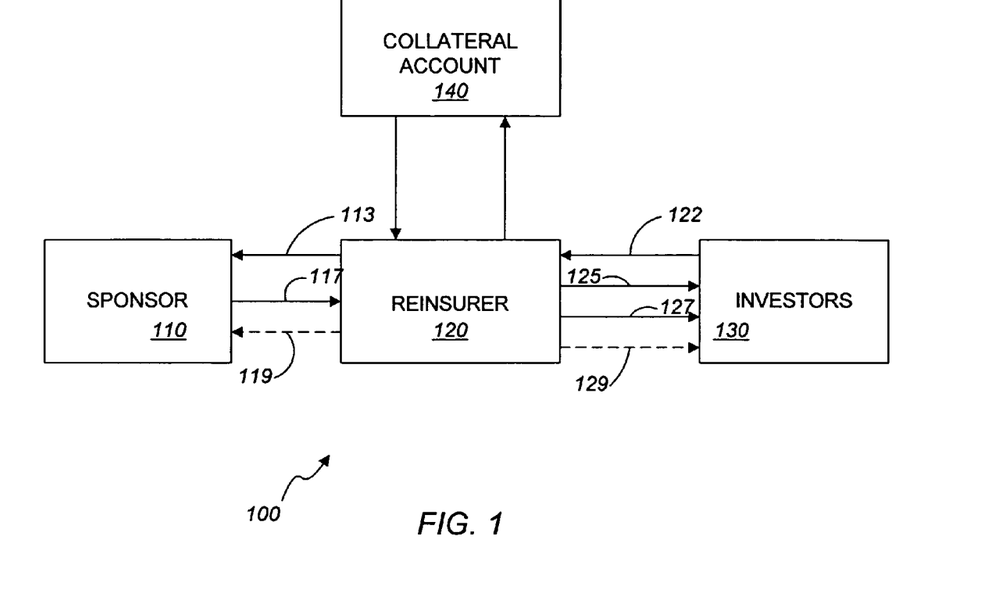
FIG. 1 is block diagram schematically illustrating a catastrophe bond transaction according to one aspect of the invention.

FIG. 1 is a block diagram schematically illustrating a catastrophe bond transaction 100 in accordance with one aspect of the invention. A sponsor 110 purchases a reinsurance contract 113 from a reinsurer 120. In one implementation, sponsor 110 is a corporation, insurer or reinsurer, and reinsurer 120 is a special purpose vehicle ("SPV"), such as an independent, charitably owned trust that is licensed as a reinsurer in an offshore location, that is established for the purpose of the catastrophe bond transaction. In exchange for its premium 117 paid to reinsurer 120, sponsor 110 receives coverage against one or more classes of natural catastrophe events as will be described in more detail below.

Reinsurer 120 issues risk instruments 125 representing a risk of occurrence of one or more realization events. Investors 130 provide a principal payment 122 to reinsurer 120 and, in exchange, receive one or more risk instruments—typically referred to as catastrophe bonds. Reinsurer 120 invests the principal 122 and the premium 117—for example, in a collateral account 140, such as a trust account. In one implementation, the trust account funds are invested in a secure investment, such as AAA rated securities that provide a relatively risk-free return (e.g., at the London Interbank Offered Rate (LIBOR)). Optionally, reinsurer 120 may enter into additional agreements to ensure that this return will be available for periodic payments to the investors. The earnings from the investment of principal 122, as well as the premium 117 paid by sponsor 110, are paid to investors 130 as a return 127 on their investment. For example, investors 130 can receive periodic (e.g., quarterly) payments distributing the premium 117 paid by sponsor 110 and interest earned on the funds in collateral account 140 during that or a preceding period.

Each risk instrument represents the risk of occurrence of one or more realization events—for example, the risk that a specified natural catastrophe event will occur in a specified region during a specified time period, as will be described in more detail below. A realization event can be a single occurrence that meets a specified physical threshold (e.g., an earthquake of a specified magnitude), or that results in a specified amount of damage or loss. Alternatively, or in addition, a realization event can be a combination of occurrences, of the same or different types (e.g., two or more earthquakes, or an earthquake and a hurricane), in the same region or different regions. The definition of a realization event is discussed in more detail below.

If no catastrophe event of the type by a given class (i.e., a realization event) occurs during the risk period, the principal 122 paid by investors in instruments of the class is returned 129 to the investors (e.g., on a predetermined redemption date). If, on the other hand, one or more realization events do occur during the risk period, reinsurer 120 will pay some or all of the principal 122 to sponsor 110 as an event payment 119 under the reinsurance contract. Optionally, a portion of the principal 122 can be reserved to cover subsequent realization events after a first realization event occurring during the risk period. Any principal 122 that remains after any event payments are made will be returned 129 to the investors on the redemption date.

Each risk instrument issued by reinsurer 120 represents one or more natural catastrophe risks belonging to one or more classes of natural catastrophe risk. A class can represent the risk of occurrence of one or more natural catastrophe events of a particular type (i.e., an individual natural catastrophe risk), such as a hurricane, windstorm or earthquake. In one implementation, the individual risks represented by different classes are not correlated with one another. In addition to representing individual risks, a class can alternatively represent a risk of occurrence of one of a plurality of types of natural catastrophe events, or a risk of occurrence of multiple different types of events. Thus, for example, a class can represent a risk associated with the occurrence of both a hurricane and an earthquake.

The natural catastrophe risk represented by a given class of risk instrument can be associated with one or more particular geographic regions. Thus, a risk instrument can represent the risk that a natural catastrophe event will occur in a particular region or regions—for example, the risk that a hurricane will occur on the Atlantic coast of the United States, that an earthquake will occur in Japan, or that a windstorm will occur in Europe.

Each instrument is also associated with a particular risk period—the time during which a realization event must occur in order to trigger an event payment from reinsurer 120 to sponsor 110 under the reinsurance contract. The risk period associated with a given risk class can be of any duration, such as a period of months or years, and can be established at the time the risk class is established, or at the time if issuance of the first or subsequent series of risk instruments of the class. Where a program involving multiple risk classes is established, a single risk period can be applied to all risk instruments issuing in any of the classes under the program; alternatively, different risk periods can be defined for one or more of the classes, or for individual series of instruments issued in a particular class.

Risk instruments of a given class can be issued from time to time on a recurring basis in additional collections or series for each class. Additional series can be issued at predetermined intervals, such as on a quarterly basis. The predetermined intervals can be established when the risk classes are established, or at the time of an initial issuance or placement of risk instruments of one or more risk classes. Alternatively, a program can be established such that sponsor 110 and/or reinsurer 120 have the option of issuing additional series of risk instruments at any time. In either case, the sponsor and/or reinsurer can have the option to issue additional series of risk instruments or not, based on market conditions such as need for additional coverage or investor demand. Each series of a given class can be issued by the same reinsurer 120 (SPV), which optionally can have different cells or units for each issuance. Alternatively, each class, or each series, can be issued by a different reinsurer 120 (e.g., a SPV established for the class or for the particular series).

In one implementation, the risk instruments are issued in an ongoing program of securitizing natural catastrophe risk through a reverse inquiry process. The sponsor 110 and/or reinsurer 120 establish one or more risk classes, as discussed above, and communicate general terms and conditions, such as the risks covered, the applicable indices and triggers, ratings, and the like, to one or more dealers, brokers, or agents. An initial placement of risk instruments (i.e., a first series of instruments for one or more classes) of a predetermined size can be placed with investors to initiate the program. Investors can then express interest in a subsequent series to a dealer, broker or agent, who then passes this interest along to reinsurer 120 and/or sponsor 110. The reinsurer and/or sponsor can then decide whether to accept the proposed transaction and issue subsequent series of risk instruments according to the investor demand, optionally taking the structure of the investor's proposed transaction into consideration when determining the terms and conditions (e.g., the specific terms applicable to the series in question) that will be applicable to the risk instruments of the subsequent series. The dealer, broker or agent then issues risk instruments to the investor according to these terms and conditions. Alternatively, the first and/or subsequent collections of risk instruments can be issued using other conventional processes.

The terms of each risk instrument can vary according to the class of risk, the length of the risk period, and the market conditions at the time of issuance. Each risk instrument in a given class—that is, instruments of any series of a given class—will share the same underlying risk (e.g., Atlantic hurricane, Japanese earthquake, European windstorm), and will be subject to identical terms ("class terms"), except that certain terms ("series terms"), such as the issuance date, interest spread, scheduled maturity date, extension spread, swap spread and ratings may be different for each series of a class, as is described in more detail below. The size of each placement (i.e., each series of a given class) can also vary, depending on market conditions such as the sponsor's need for additional coverage and investor demand.

Figure 2:
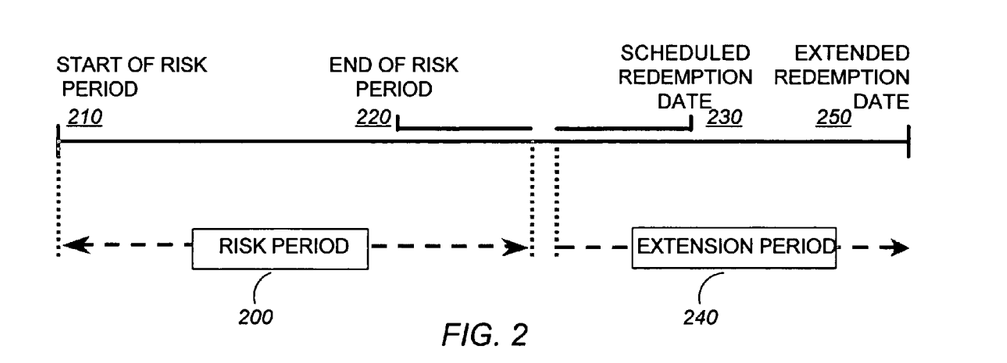
FIG. 2 illustrates a timeline for one implementation of a catastrophe bond transaction according to FIG. 1.

A timeline representing the course of a catastrophe bond transaction according to one implementation of the invention is shown in FIG. 2. After issuance of risk instruments of a given class, coverage for the natural catastrophe risk represented by the class attaches at the start 210 of a risk period 200. Reinsurer 120 makes periodic payments of LIBOR+ spread to investors 130 during risk period 200, and, if no realization event occurs by the end of the risk period 220, reinsurer 120 returns principal 122 to investors 130 on scheduled redemption date 230. If a realization event occurs during risk period 200, reinsurer 120 uses all or a portion of principal 122 to make an event payment to sponsor 110. In some implementations, the risk instruments can be structured to provide for event payments to sponsor 110 soon after the occurrence of a realization event. Alternatively, any event payments can be made at a predetermined date, such as scheduled redemption date 230.

In the implementation illustrated in FIG. 2, the occurrence of a realization event delays any distribution of principal 122 to investors 130 by triggering an extension period 240, during which time event payments can be made to sponsor 110, and/or interest on the investment of any remaining portion of principal 122 can be accrued to provide for repayment of principal 122 to investors 130. Any remaining principal 122 is distributed to investors 130 on extended redemption date 250.

Each class of risk has associated trigger criteria that define when an event payment will be made by reinsurer 120 to sponsor 110 (i.e., when a realization event occurs). The trigger criteria can be defined by reference to an index of measurable physical parameters, losses incurred over a specified time period (either by the sponsor 110 or an industry-wide basis), or some combination of these.

Where the trigger criteria are defined by reference to a parametric index, the index can be based on physical parameters associated with the relevant natural catastrophe risk. In such implementations, the trigger criteria are linked to physical parameters that are "risk specific" and that are specifically designed—based, for example, on mathematical modeling of historical data—for the risks and geographic regions covered by the transaction. Where appropriate, the physical parameter data on which the index is based includes a statistically significant number of measurements, obtained over a number of years and at multiple locations, such as multiple instruments or stations, distributed over the geographic region associated with a given risk class. Thus, for example, trigger criteria for a risk class covering California earthquakes might include a parametric index derived from an analysis of historical data showing earthquake magnitudes and associated damage and/or losses at a variety of locations with an established history of seismic activity throughout the state. Using this type of trigger, a catastrophe event that exceeds a specified physical threshold, such as an earthquake of more than a threshold magnitude, would qualify as a realization event, whereas an earthquake in the same region of lower magnitude would not, even if the second earthquake resulted in more damage and/or losses.

Triggers based on physical indices are directly linked to observations published by neutral third parties, such as government geological and meteorological agencies. The physical parameter data can be, for example, data measured and reported by a third party organization or agency (typically not affiliated with sponsor 110 or reinsurer 120), such as the National Hurricane Center of the U.S. National Oceanic and Atmospheric Administration (NOAA) for hurricanes, the U.S. Geological Survey for earthquakes, or the various national weather services of the United Kingdom, Germany, France and other states for European wind storms. By using parametric criteria, rather than basing the trigger strictly on loss exposure, event payments are triggered by predetermined physical events, made and reported by presumably neutral parties. A description of the parametric index, and the definition of a realization event, is typically provided to prospective investors. Together, this provides rating agencies and investors with a measure of transparency in assessing the risks associated with a particular transaction.

The expected loss associated with risk instruments to be issued in a given class can be modeled, and the modeling results can be provided to prospective investors. Using known modeling techniques, an expected loss can be determined in the form of an index of probabilities of exceedance associated with a given class, by analyzing and parameterizing historical data, such as weather data, studies published by government reporting agencies, academic researchers, private organizations, and the like. Ratings can be assigned to risk instruments of a given class or series (e.g., by a commercial rating agency) based on the expected loss.

The trigger criteria associated with each risk class are used to determine when a realization event occurs. In some implementations, reinsurer 120 makes this determination upon receipt of a claim from sponsor 110 under reinsurance contract 113. Alternatively, reinsurer 120 can determine at predetermined intervals, or at the end of the risk period, whether a realization event has occurred.

To determine whether a realization event has occurred, reinsurer 120 obtains event data and determines whether the trigger criteria have been satisfied. Depending on the particular type of trigger, the event data can be obtained in the form of physical parameter data or loss data observed and reported by the relevant reporting organization (or, in the case of a trigger based on losses suffered by sponsor 110, in the form of internal data, such as audit data, of sponsor 110). For triggers based on physical parameters, the event data can include observations reported by one or more specified reporting agencies, such as seismic data, windspeed data, or the like, recorded for one or more locations in the geographic region covered by the transaction. For loss-based triggers, the event data can include published reports of industry-wide losses attributed to a particular event or events, or the results of an audit of the sponsor's portfolio, as appropriate.

Reinsurer 120 compares the event data to the relevant trigger criteria and, if a predetermined specified threshold is met, a realization event has occurred. As discussed above, the predetermined specified threshold can correspond to reported physical parameter observations exceeding a specified magnitude and/or duration, or to reported losses of a specified size, or the like.

In some implementations, the catastrophe bond transaction can be structured to provide for a scale of realization events and corresponding event payments. In such an implementation employing a loss-based trigger, for example, the transaction can be structured such that a loss in a first predetermined range will provide for an event payment to sponsor 110 of a first portion of the principal, while a loss in a second, higher, range will result in an event payment of a second, larger portion of the principal, and a loss above a third threshold will result in complete forfeiture of the principal. Thus, an industry-wide loss from $10 to $15 billion might result in an event payment of 33% of the principal, a loss in the $15-$20 billion range might result in a payment of 66% of the principal and a loss above $20 billion might cause the entire principal to be paid to sponsor 110. A similar structure could be applied to triggers based on physical parameters, such that an earthquake of a first specified magnitude (or a hurricane of a first specified category or a windstorm having a first specified duration, windspeed, or combination thereof) would trigger an event payment of a first portion of the principal, while an event of a more serious magnitude would trigger correspondingly larger event payments to the sponsor.

Similarly, the transaction can be structured to provide coverage for second or subsequent events during the risk period. In such implementations, the transaction can be structured to provide an amount of principal that is at risk only if one catastrophe event has already occurred. This can be the whole amount of principal, such that coverage under the reinsurance contract attaches only for the second event of a covered type, or it can provide for additional coverage, such that a first event is covered up to a first principal amount, and the second event is covered up to a second amount.

Figure 3:
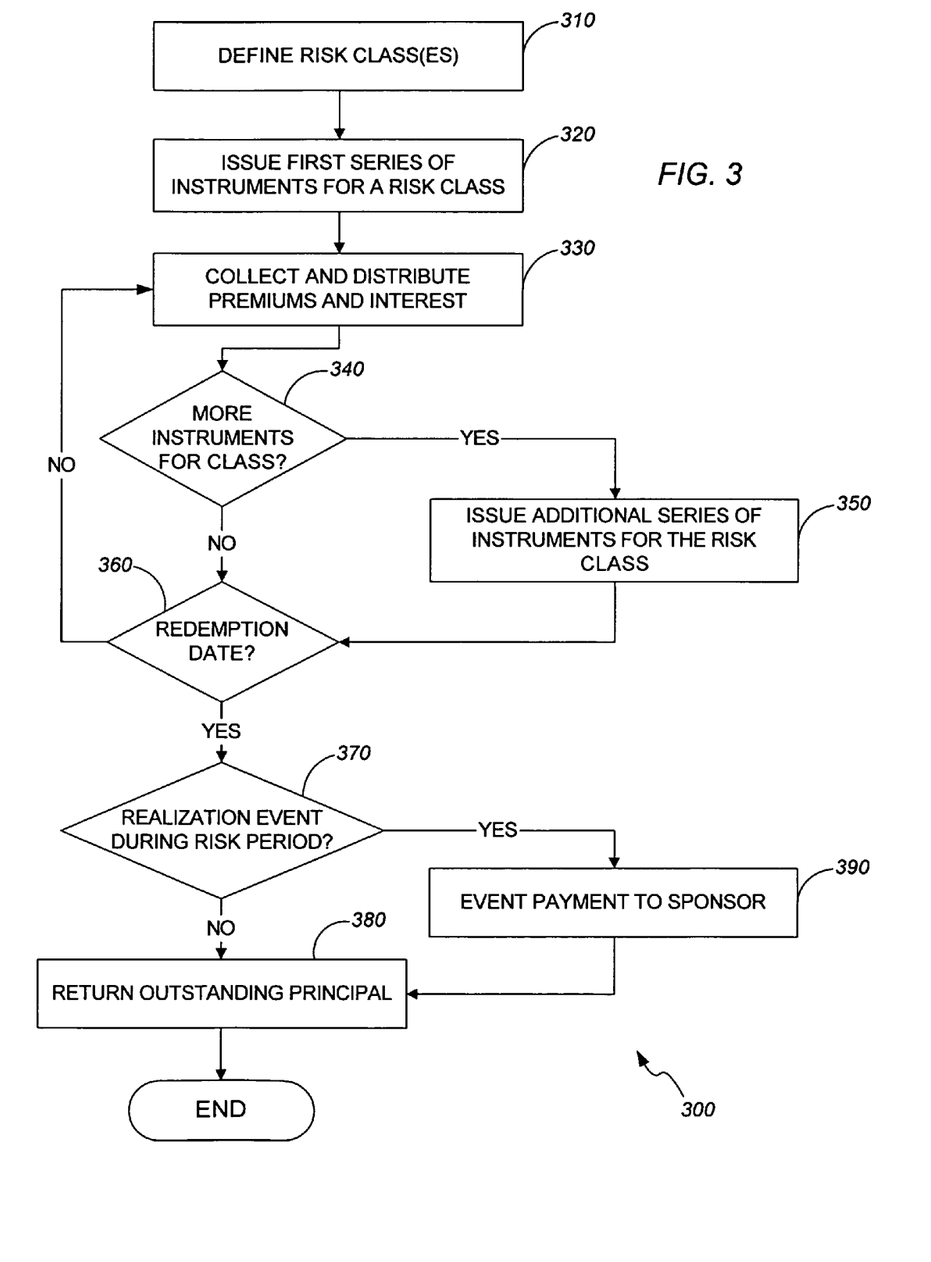
FIG. 3 is a flow diagram illustrating a method for securitizing natural catastrophe risk by issuing risk instruments of one or more recurringly issuable classes according to one aspect of the invention.

A method 300 of securitizing natural catastrophe risk using a program of catastrophe bond transactions 100 is illustrated in FIG. 3. To begin the method 300, one or more risk classes are established (step 310). As discussed above, each risk class represents the risk of occurrence of one or more natural catastrophe events of a particular type, or a combination of types, in a particular region or regions during a risk period. The risk classes can be established by sponsor 110—e.g., an insurer, reinsurer or corporation seeking to obtain coverage for the represented risks. Alternatively, the risk classes can be established by reinsurer 120.

Establishing the risk class or classes will typically include defining class terms that will remain relatively constant across multiple issues of a given class during the course of the program. These class terms can include, for example, the actual risk or risks covered by each class, parametric indices and trigger conditions that will be used to determine when a realization event occurs, modeling of expected loss, bond ratings, and the like.

A first collection (e.g., series) of risk instruments of a class is issued by reinsurer 120 (step 320). One or more series terms can be established for risk instruments in the first series at the time of issuance. These terms will typically reflect the timing and market conditions (e.g., investor demand) as of the date of issuance, and will include such terms as interest spread and maturity date. Depending on the circumstances, it may also be necessary or advantageous to update other terms and conditions associated with the transaction, or the program in general, at the time of issuance, such as the investment rating associated with the particular issuance or the modeling of expected loss (which may be desirable, for example, after the occurrence of a major catastrophe event). Some terms and conditions can be altered or updated on a regular (or irregular) basis that does not necessarily coincide with each new issuance under the program. The risk instruments in the first series are placed with or distributed to investors, typically by a dealer, broker or agent. Optionally, sponsor 110 and/or reinsurer 120 can participate in the placement or risk instruments with investors. In exchange for their investment. During the risk period, reinsurer 120 periodically collects premiums 117 from sponsor 110 and distributes the collected premiums and the interest earned on the invested principal to the investors 130 (step 330).

If sponsor 110 or reinsurer 120 subsequently determines that additional risk instruments are to be issued for the class (the "YES" branch of step 340), one or more additional series of risk instruments of the class are issued (step 350). Additional series of instruments can be issued at periodic intervals (which may be defined when the risk classes are established in step 310) during the risk period. Sponsor 110 and/or reinsurer 120 can elect whether to issue additional series of instruments at these intervals based on market conditions, such as the sponsor's need for additional coverage, investor demand, and the like. Alternatively, the risk classes can be defined such that additional series of risk instruments can be issued at any time, based, for example, on market conditions. One or more series terms for risk instruments of such additional series can be determined as the time of issuance as described above.

When the redemption date for risk instruments in a series is reached (the "YES" branch of step 360) and no realization event has occurred (the "NO" branch of step 370), the principal 122 is returned to investors 130 (step 380). If a realization event associated with the risk class occurs during the risk period (the "YES" branch of step 370), reinsurer 120 provides some or all of the principal 122 to sponsor 110 as an event payment 119 (step 390). Any remaining portion of principal 122 is ultimately returned to investors 130 (step 380).

Figure 4:
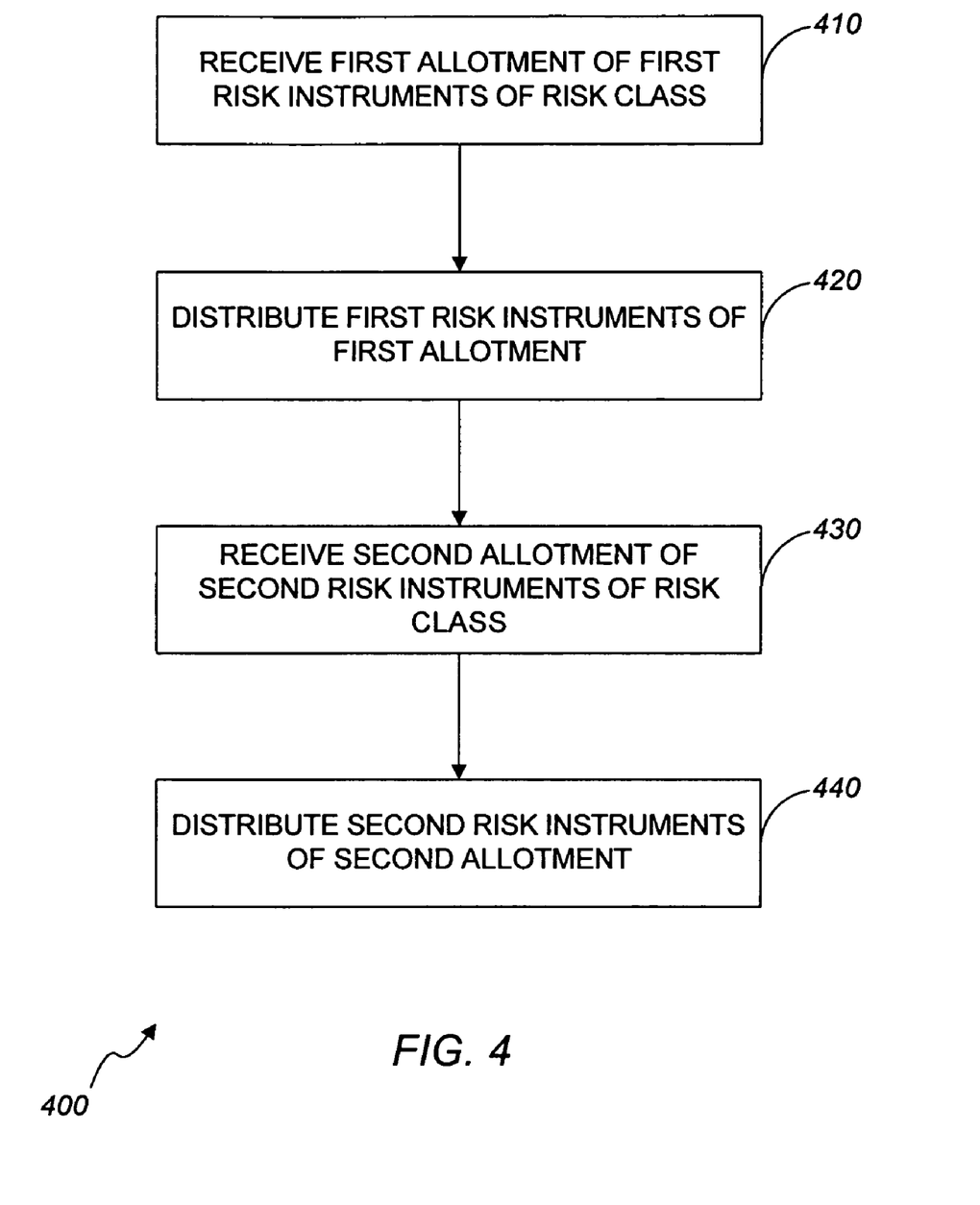
FIG. 4 is a flow diagram illustrating a method of distributing risk instruments of one or more recurringly issuable risk classes according to one aspect of the invention.

A method 400 of distributing risk instruments according to one aspect of the invention is illustrated in FIG. 4. The method begins when a dealer, broker or agent receives a first allotment of first risk instruments of a risk class (step 410). The first risk instruments represent natural catastrophe risk associated with the risk class, and have a set of terms and conditions including class terms and series terms. The risk class is established such that risk instruments of the risk class can be issued on a recurring basis as discussed above. The first allotment is received from a reinsurer 120 or sponsor 110 that has issued the first risk instruments as described above.

The first risk instruments are distributed to investors in exchange for principal payments (step 420). The principal payments are provided to the reinsurer 120, which invests the principal payments as described above. In one implementation, the first allotment is provided, and the first risk instruments are distributed, through a reverse inquiry process as described above.

On a subsequent date, the dealer, broker or agent receives a second allotment of second risk instruments of the risk class (step 430). The second risk instruments have a set of terms and conditions including class terms and series terms. The class terms of the second risk instruments are the same as those for the first risk instruments of the first allotment. The series terms of the second risk instruments are defined at the time of issuance of the second risk instruments, and can be the same as or different from the series terms of the first risk instruments, depending, for example, on market conditions when the second risk instruments were issued. The second risk instruments of the second allotment are distributed to investors (step 440) in exchange for principal payments that are provided to reinsurer 120 for investment as described above.

In one implementation, a set of six risk classes is established to provide coverage for five individual natural catastrophe risks for a four year risk period extending from June 2002 to June 2006. The set of risk classes includes five risk classes representing individual natural catastrophe risks and one risk class representing a combination of the five individual risks. The five individual risk classes include a North Atlantic Hurricane class, a European Windstorm class, a California Earthquake class, a Central U.S. Earthquake class, and a Japan Earthquake class. The combined class represents a combination of two or more of these risks. Each class is established such that additional series of risk instruments can be issued on a quarterly basis following an initial placement of a first series for each class.

The North Atlantic Hurricane class is established to protect against hurricanes in a covered area that includes the states of Texas, Louisiana, Mississippi, Alabama, Florida, Georgia, South Carolina, North Carolina, Virginia, Washington D.C., Maryland, Delaware, New Jersey, New York, Pennsylvania, Connecticut, Rhode Island, Massachusetts, Vermont, New Hampshire and Maine, as well as Puerto Rico, the U.S. Virgin Islands, the Dominican Republic, Jamaica, Cayman Islands, Bahamas, and the Turks and Caicos Islands.

The trigger criteria of the North Atlantic Hurricane class are based on a parametric index derived from data reported by the U.S. National Hurricane Center (NHC), which is a branch of the Tropical Prediction Center (TPC) under the National Oceanic and Atmospheric Administration (NOAA). The NHC prepares and distributes Hurricane watches and warnings for the general public, and also prepares and distributes marine and military advisories for other users. The NHC issues Tropical Cyclone Reports that contain comprehensive information on each storm, including synoptic history, meteorological statistics, casualties and damages, and the post-analysis best track (including six-hour positions and intensities). The NHC issues advisories in near real time during a hurricane event every 1 to 6 hours. Tropical Cyclone Reports are generally released within several months after a hurricane and are considered the definitive report regarding the hurricane.

A North Atlantic Hurricane Event is defined as a storm or storm system occurring during the risk period that has been declared by the National Hurricane Center/Tropical Prediction Center to be a hurricane, and that has maximum sustained winds at some point in its life of over 95 knots. Index values ($IV_{NAH}$) for North Atlantic Hurricane Events are determined according to a North Atlantic Hurricane Index Formula:

$$IV_{NAH} = 0.01725 \times \sum_{i=1}^{3600} w_i \times \langle v_i - 15 \rangle^4$$

wherein i is the relevant North Atlantic Hurricane Calculation Location, $w_i$ is the relative weight of North Atlantic Calculation Location i, and $v_i$ is the greater of the Calculated Peak Gust Wind Speed at North Atlantic Calculation Location i in m/s and 15 m/s.

Figure 5:
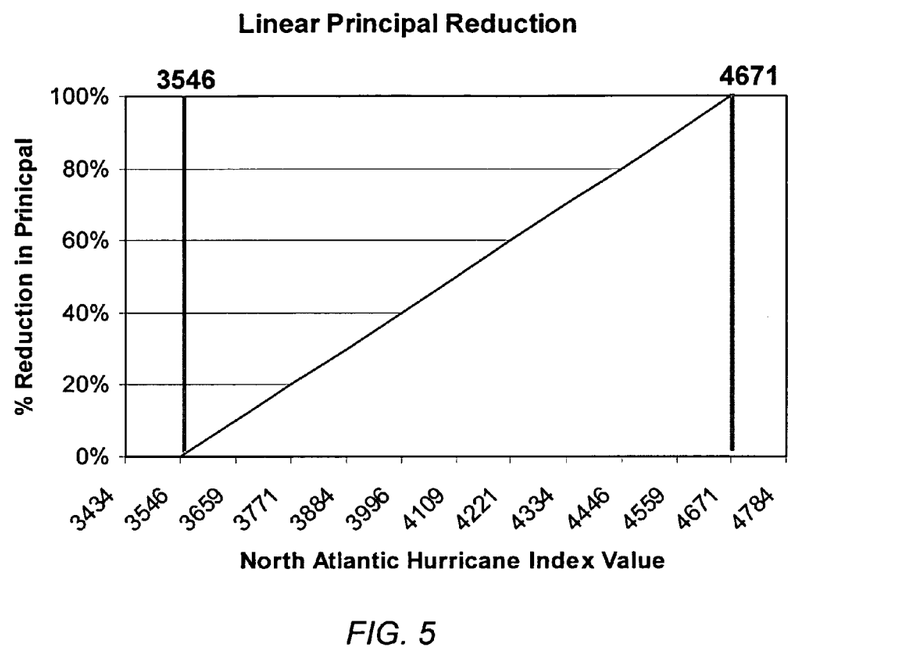
FIG. 5 illustrates the linear principal reduction of an exemplary risk class representing a North Atlantic Hurricane risk according to one aspect of the invention.
Figure 6:
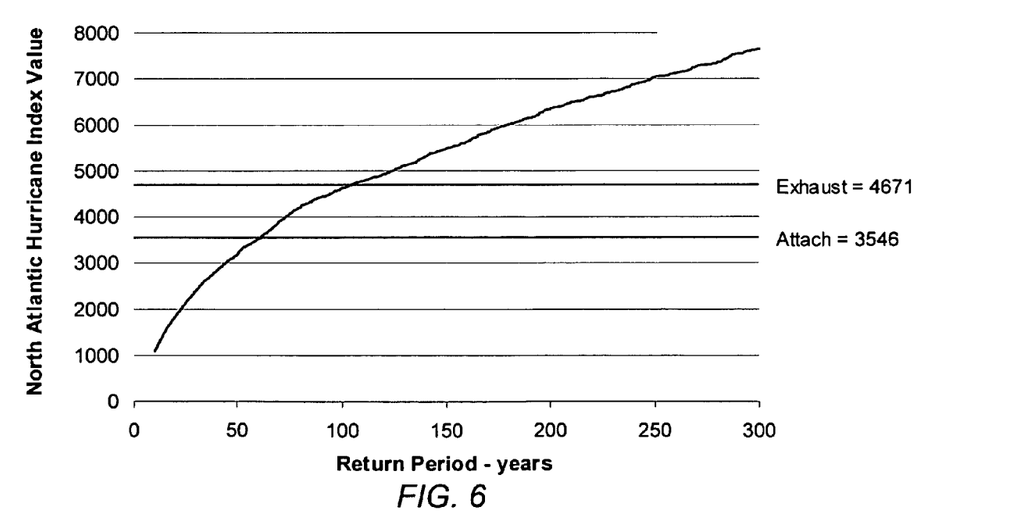
FIG. 6 illustrates loss exceedance probabilities calculated for risk instruments of the North Atlantic Hurricane risk class illustrated in FIG. 5.

The transaction is structured such that coverage attaches for an event with an index value of 3546 and the principal is exhausted by an event with an index value of 4671, with a linear principal reduction for events with index values falling between these extremes as shown in FIG. 5. For this risk class, the attachment probability is calculated as 1.59%, the exhaustion probability is 0.97%, and the expected loss is 1.28%. The loss exceedance probability calculated for the class is illustrated in FIG. 6.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results. Additional parties can be involved in the catastrophe bond transaction. For example, an additional reinsurer 120 can act as an intermediary between sponsor 110 and the special purpose vehicle (reinsurer 120 in FIG. 1).

What is claimed is:

1. A method of securitizing natural catastrophe risk, implemented on an electronic terminal at a reinsurer, comprising:
    establishing one or more risk classes at the electronic terminal of the reinsurer, each risk class representing one or more natural catastrophe risks, each risk class being recurringly issuable from the electronic terminal of the reinsurer as risk instruments providing a return on an investment, the amount of the return for a risk instrument being reduced upon the occurrence of a realization event for the corresponding represented natural catastrophe risk; and
    issuing from the electronic terminal at the reinsurer, a first collection of risk instruments of a first risk class of the one or more risk classes, wherein
    the realization event for a given risk class is defined as an occurrence of an event meeting a predetermined impact threshold,
    the occurrence of the event meeting predetermined impact threshold is determined according to an index of physical parameters issued by a neutral party, and
    said physical parameters are related to but separate from catastrophic loss.

2. The method of claim 1, wherein the one or more risk classes include a plurality of risk classes each representing an individual natural catastrophe risk, and one or more risk classes representing a combination of natural catastrophe risks represented by two or more of the plurality of risk classes.

3. The method of claim 2, wherein the individual natural catastrophe risks are not correlated.

4. The method of claim 1, wherein issuing the first collection of risk instruments includes issuing the first collection of risk instruments on a first issue date the method further comprising:
    issuing a second collection of risk instruments of the first risk class on a second issue date, the second issue date being after the first issue date.

5. The method of claim 4, wherein the risk instruments of the first risk class have an associated plurality of terms, the plurality of terms including class terms and series terms, the class terms being defined for all risk instruments of the first risk class during the establishing of the first risk class, the series terms being defined for risk instruments of a given collection of risk instruments of the first series at the time of issuance of the collection, the series terms including an interest spread defining an amount payable to an investor, and a maturity date defining a date on which a principal amount will be returned to the investor if no realization event has occurred.

6. The method of claim 1, wherein the risk classes represent natural catastrophe risks selected from the group consisting of hurricanes, windstorms, floods, and earthquakes.

7. The method of claim 1, wherein the risk classes categorize natural catastrophe risks by region or by time period.

8. A method of distributing instruments representing securitized natural catastrophe risk, implemented on an electronic terminal at a reinsurer, the method comprising:
    receiving, at the electronic terminal of the reinsurer, a first allotment of first risk instruments of a risk class representing one or more natural catastrophe risks, the risk class being issuable from the electronic terminal at the reinsurer on a recurring basis, each of the first risk instruments having a first issue date and providing a return on an investment, the amount of the return being reduced upon the occurrence of a realization event for the corresponding represented natural catastrophe risk; and
    distributing from the electronic terminal at the reinsurer, the first risk instruments of the first allotment to one or more investors, wherein
    the realization event for a given risk class is defined as an occurrence of an event meeting a predetermined impact threshold,
    the occurrence of the event meeting the predetermined impact threshold is determined according to an index of physical parameters issued by a neutral party, and
    said physical parameters are related to but separate from catastrophic loss.

9. The method of claim 8, further comprising:
    receiving an allotment of second risk instruments of the risk class representing the one or more natural catastrophe risks, each of the second risk instruments having a second issue date, the second issue date being after the first issue date; and
    distributing the second risk instruments of the second allotment to the one or more investors.

10. The method of claim 9, wherein the risk instruments of the risk class have an associated plurality of terms, the plurality of terms including class terms and series terms, the class terms being defined for all risk instruments of the risk class, the series terms being defined for risk instruments of a given collection of risk instruments of the first series at the time of issuance of the collection, the series terms including an interest spread defining an amount payable to an investor, and a maturity date defining a date on which a principal amount will be returned to the investor if no realization event has occurred.

11. A computer readable storage medium encoded with computer program instructions which cause a computer to execute a method of securitizing natural catastrophe risk, comprising:

establishing one or more risk classes, each risk class representing one or more natural catastrophe risks, each risk class being recurringly issuable as risk instruments providing a return on an investment, the amount of the return for a risk instrument being reduced upon the occurrence of a realization event for the corresponding represented natural catastrophe risk; and issuing a first collection of risk instruments of a first risk class of the one or more risk classes, wherein the realization event for a given risk class is defined as an occurrence of an event meeting a predetermined impact threshold, and the occurrence of the event meeting the predetermined impact threshold is determined according to an index of physical parameters issued by a neutral party, and said physical parameters are related to but separate from catastrophic loss.

12. The computer readable storage medium of claim 11, wherein the one or more risk classes include a plurality of risk classes each representing an individual natural catastrophe risk, and one or more risk classes representing a combination of natural catastrophe risks represented by two or more of the plurality of risk classes.

13. The computer readable storage medium of claim 12, wherein the individual natural catastrophe risks are not correlated.

14. The computer readable storage medium of claim 11, wherein the computer program instructions cause the computer to execute the method further comprising:

issuing the first collection of risk instruments on a first issue date; and issuing a second collection of risk instruments of the first risk class on a second issue date, the second issue date being after the first issue date.

15. The computer readable storage medium of claim 14, wherein the risk instruments of the first risk class have an associated plurality of terms, the plurality of terms including class terms and series terms, the class terms being defined for all risk instruments of the first risk class during the establishing of the first risk class, the series terms being defined for risk instruments of a given collection of risk instruments of the first series at the time of issuance of the collection, the series terms including an interest spread defining an amount payable to an investor, and a maturity date defining a date on which a principal amount will be returned to the investor if no realization event has occurred.

16. The computer readable storage medium of claim 11, wherein the risk classes represent natural catastrophe risks selected from the group consisting of hurricanes, windstorms, floods, and earthquakes.

17. The computer readable storage medium of claim 11, wherein the risk classes categorize natural catastrophe risks by region or by time period.

* * * * *